United States Patent [19]

Dehling

[11] Patent Number: 5,124,507
[45] Date of Patent: Jun. 23, 1992

[54] CABLE SPLICE ASSEMBLY FOR CONNECTING AND BRANCHING CABLES PARTICULARLY TELECOMMUNICATION CABLES

[75] Inventor: Helmut Dehling, Dorsten, Fed. Rep. of Germany

[73] Assignee: Stewing Kunststoffbetrieb GmbH, Dorsten, Fed. Rep. of Germany

[21] Appl. No.: 590,347

[22] Filed: Sep. 28, 1990

[30] Foreign Application Priority Data

Sep. 30, 1989 [DE] Fed. Rep. of Germany ....... 3932734
Dec. 14, 1989 [DE] Fed. Rep. of Germany ....... 3941269

[51] Int. Cl.⁵ .......................................... H02G 15/113
[52] U.S. Cl. .......................... 174/92; 174/76; 174/93
[58] Field of Search ..................... 174/92, 93, 76

[56] References Cited

U.S. PATENT DOCUMENTS

| | | | |
|---|---|---|---|
| 3,215,761 | 11/1965 | Gelpey | 174/22 R X |
| 3,692,926 | 9/1972 | Smith | 174/92 |
| 4,216,351 | 8/1980 | Brandeau | 174/92 |
| 4,424,412 | 1/1984 | Goetter et al. | 174/92 |
| 4,492,816 | 1/1985 | Morel et al. | 174/92 |
| 4,704,499 | 3/1987 | Faust | 174/92 |
| 4,831,215 | 5/1989 | Clark et al. | 174/92 |
| 4,933,512 | 6/1990 | Nimiya et al. | 174/92 |

Primary Examiner—Morris H. Nimmo
Attorney, Agent, or Firm—Toren, McGeady & Associates

[57] ABSTRACT

A cable splice assembly for connecting and branching cables, particularly telecommunication cables. The cable splice assembly includes a splice assembly pipe and sealing members with cable passage openings for insertion in the end faces of the pipe sleeve. The sealing members are transversely divided into sealing member halves which include semicircular sealing elements which line the cable passage openings. The sealing members each have two cable passage openings which are spaced from each other at a predetermined distance in longitudinal direction of the cable. An injection chamber suitable for all cables is provided between the front and rear cable passage openings. The sealing member halves have tongue and groove connections in the abutting edge surfaces. The sealing member halves can be clamped to each other. Individually removable bearing shells are placed in the cable passage openings in order to adapt the openings to different cable diameters.

16 Claims, 12 Drawing Sheets

CABLE SPLICE ASSEMBLY FOR CONNECTING AND BRANCHING CABLES PARTICULARLY TELECOMMUNICATION CABLES

BACKGROUND OF THE INVENTION

1. Field of the Invention

The present invention relates to a cable splice assembly for connecting and branching cables, particularly telecommunication cables. The cable splice assembly includes a pipe sleeve and sealing members with cable passage openings for insertion in the end faces of the pipe sleeve. The sealing members are transversely divided resulting in sealing member halves which include semicircular sealing elements which line the cable passage openings for adapting to different cable diameters.

2. Description of the Related Art

Cable splice assemblies for compressed air-monitored cable units are known. These cable splice assemblies are composed essentially of a longitudinally divided pipe sleeve which is held together by means of clamping members and sealing members arranged in the end faces of the socket pipe. The sealing members include a disk-shaped end flange which is concentrically surrounded by the socket wall, a projection which is integrally formed with the end flange, is directed into the interior of the splice assembly and narrows toward the end flange, and is divided into two or three portions perpendicularly to the disk plane.

In addition, the sealing members are connected to each other by means of diametrically oppositely arranged rails which are fastened at the projections of offset relative to the separating planes. Moreover, rigid support members are arranged at the projections of the sealing member portions so as to bridge the separating planes of the sealing member portions. Cable splice assemblies of this type are relatively complicated with respect to manufacture and assembly and they are not sufficiently flexible with respect to different cable diameters. Especially the sealing means for the cable is not satisfactory.

In another known cable arrangement, sealing chambers are provided for sealing the cable in the cable passages. The sealing chambers are filled with a viscose or viscose-plastic sealing material. The sealing material consists in this case of several concentrically arranged semicircular sealing pieces.

SUMMARY OF THE INVENTION

It is, therefore, the primary object of the present invention to provide a cable splice assembly for connecting and branching cables, particularly telecommunication cables, of the above-described type, which is of simple and safe construction with respect to manufacture and assembly, ensures a problem-free sealing of cables of different diameters and can be closed compressed air-tight as well as water-tight.

In accordance with the present invention, a cable splice assembly of the type referred to above includes sealing members which each have two cable passage openings which are spaced from each other at a predetermined distance in the longitudinal direction of the cable. An injection chamber suitable for all cables to be accommodated is provided between the forward and the rearward cable passage opening. The injection chamber has an injection opening and a venting opening. The sealing member halves forming each sealing member have tongue and groove connections in the abutting surfaces thereof at the border portions of these abutting surfaces and between the cable passage openings. The sealing member halves can be clamped to each other. Individually removable bearing shells are placed in the cable passage openings in order to adapt the openings to different cable diameters.

Thus, the teaching of the invention provides a double-surface cable bearing in the region of each sealing member for the cable passing through the cable splice assemblies according to the invention. Moreover, the injection chamber between the two cable bearings ensures a problem-free sealing of the cable. For this purpose, a sealing material is injected into the injection chamber, so that the cable is sealed in the sealing member to all sides and in a pressure-tight manner.

The cable passage openings which define the double-surface cable bearings are defined for maximum cable diameters. The openings can be adapted to the respective cable diameter by adding or removing bearing shells. The bearing shells are of an elastomer. The bearing shells have the additional purpose to support the cables, so that the occurring relative movements do not have an influence on the sealing action.

In addition, the cable passage openings and the bearing shells may include an axial securing means in the form of interengaging toothings, for example, conical grooves. Also, the cables are placed in the respective bearing shell which corresponds to the cable diameter with sealing tapes or bands wound onto the cable. In this manner, any air gaps between the cable and the surrounding bearing shells are compensated or eliminated. The sealing tapes also are of an elastomer material.

In accordance with another important feature of the present invention, it is possible to insert in the cable passage openings bending-elastic adapter plugs with one or more bores for passing one or more cables of different diameters therethrough. Adapter plugs of this type which usually are of rubber are preferably used when branching cables. When cable passage openings are not in use, it is useful to insert filling rods in these openings. The filling rods have circumferential sealing members, for example, annular sealing members, which rest against the bearing shells. This further improves the sealing action. In this connection, the invention teaches with respect to the injection chamber that the sealing member halves of each sealing member have in their abutting regions at the edges sealing chambers for sealing the injection chamber and that sealing sections or blocks can be inserted by pressing in the sealing chambers.

In accordance with another proposal according to the present invention of independent significance, only the lower sealing member half of each sealing member has in the region of the abutting surfaces at the edge of the sealing chambers a locking nose each for engagement in a locking recess of the inserted sealing sections. The sealing sections are sealing projections of a circumferential sealing member, for example, an O-seal, which extends around the sealing member in a locking groove. As a result, the circumferential O-seal which serves to seal the respective sealing member against the pipe sleeve also serves as an assembly aid. This is because the sealing projections of the O-seal inserted in the sealing chambers are held by the locking projections so as to be protected against sliding in the circumferential locking groove so that a problem-free assembly of the circumferential sealing member and the pipe sleeve is made possible.

The injection opening and the venting opening may be bores with a threaded plug. When sealing material is injected into the injection chamber, the venting opening simultaneously serves as a control opening. This is because any sealing material which emerges from the venting opening indicates that the injection chamber is filled. It is useful to insert an air valve into the upper and/or lower sealing member half in order to be able to check the pressure tightness of the fully assembled cable socket.

In accordance with another recommendation of the invention, the sealing member halves are clamped against each other in pairs by means of threaded bolts. The threaded bolts can be screwed into bores with threaded inserts provided between the front and rear cable passage openings. By clamping the sealing member halves against each other, the abutting surfaces and particularly the groove and tongue connections are sealed in an excellent manner and the pulling force acting on the cables in the bearing shells is reduced.

The two sealing members to be placed into the pipe sleeve are preferably spaced apart from each other by means of an upper and a lower tension-reducing rail. For this purpose, the tension-reducing rails have at a predetermined distance centering bores which are engaged by centering cams on the rear side of the sealing member or on the sides of the sealing members which face each other. Moreover, an additional screw connection of the tension-reducing rails is provided. In addition, the sealing members may be provided on both sides, i.e., on the front side and on the rear side, with integrally formed centering projections for centering projections of the pipes sleeve. These integrally formed centering projections serve as stops for the centering projections of the pipe sleeve and thus, as a means for securing the pipe sleeve against rotation.

The sealing members advantageously have an elliptic circumference and are of a thermoplastic material. As a result, the cable splice assembly according to the invention is of a structure which is flat but still has a great volume, so that the cable splice assembly according to the invention can also be used for connecting and branching glass fiber cables, especially since the cable splice assembly is suitable for receiving a sufficient number of slicing boxes.

The cable splice assembly according to the present invention for connecting and branching cables, particularly conventional telecommunication cables and glass fiber cables, provides the following particular advantages. Because of the construction of the sealing members at the end faces according to the present invention, the cable splice assembly is simple with respect to manufacture and assembly and is also safe in operation. Also, the cable splice assembly can be closed easily in a pressure-tight and water-tight manner. In addition, it is still possible to ensure a problem-free sealing of cables with different diameters. Finally, a problem-free sealing between the pipe sleeve and the sealing members is provided.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
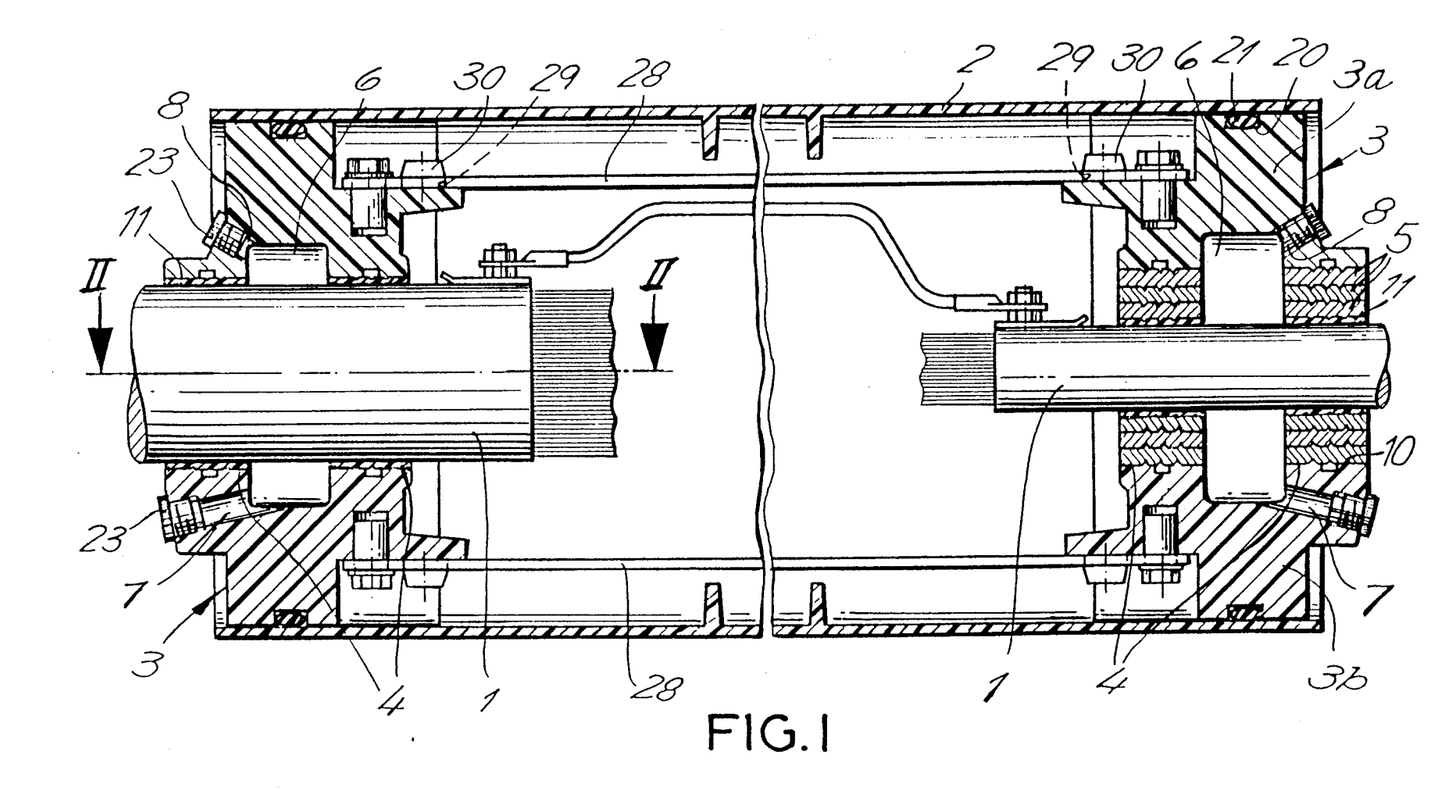
FIG. 1 is a vertical sectional view of a cable splice assembly according to the present invention.

The figures of the drawing show a cable splice assembly for connecting and branching cables 1, particularly telecommunication cables. As shown in FIG. 1, the cable splice assembly is essentially composed of a longitudinally divided, closeable pipe sleeve 2 and sealing members 3 which are inserted into the end faces of the socket pipe 2. The sealing members 3 have cable passage openings 4 and are transversely divided to form sealing member halves 3a, 3b. The cable passage openings 4 are lined with semicircular sealing elements 5 to make possible an adaptation to different cable diameters. The sealing members 3 have two cable passage openings 4 each arranged spaced apart from each other at a predetermined distance in the longitudinal direction of the cable. An injection chamber 6 suitable for all, cables 1 to be passed through the cable splice assemblies is provided between the forward and rearward cable passage openings 4. The injection chamber 6 has an injection opening 7 and a venting opening 8.

The sealing member halves 3a, 3b forming a sealing member 3 has tongue and groove connections 9 in the abutting surfaces at the border portions of the abutting surfaces and between the cable passage openings 4. The sealing member halves 3a, 3b can be clamped together. Individually removable bearing shells 5 in the form of semicircular sealing elements are inserted into the cable passage openings 4 in order to provide adaptation to different cable diameters. The cable passage openings 4 and the bearing shells 5 have interengaging toothings 10, for example, conical grooves, as an axial securing means.

The cables 1 are placed in the respective bearing shell 5 which corresponds to the cable diameter by means of sealing tapes 11 which are wound onto the cable. In addition, as only schematically illustrated in FIG. 3, it is possible to insert in the passage opening 4 bending-elastic adapter plugs 12 with one or more bores 13 for passing one or more cables 1 of different diameters therethrough.

Figure 2:
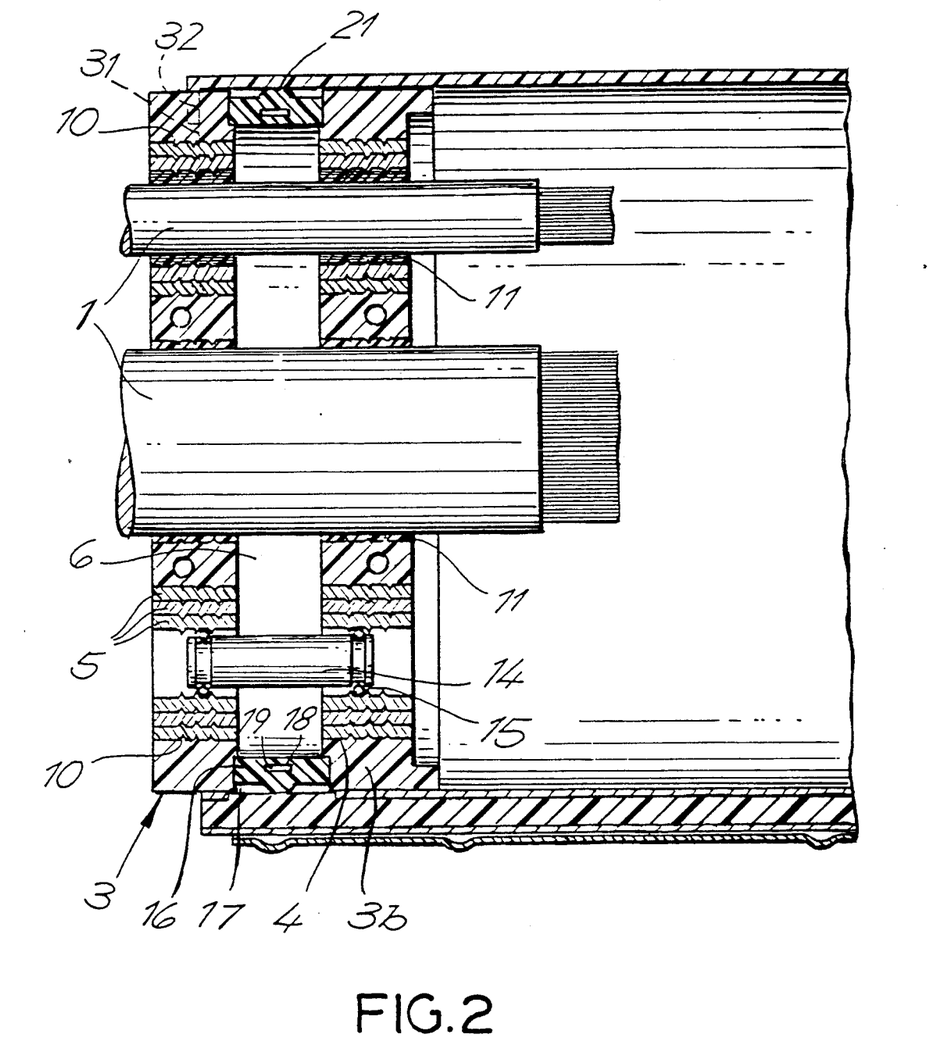
FIG. 2 is a sectional view along sectional line II—II of FIG. 1.
Figure 14:
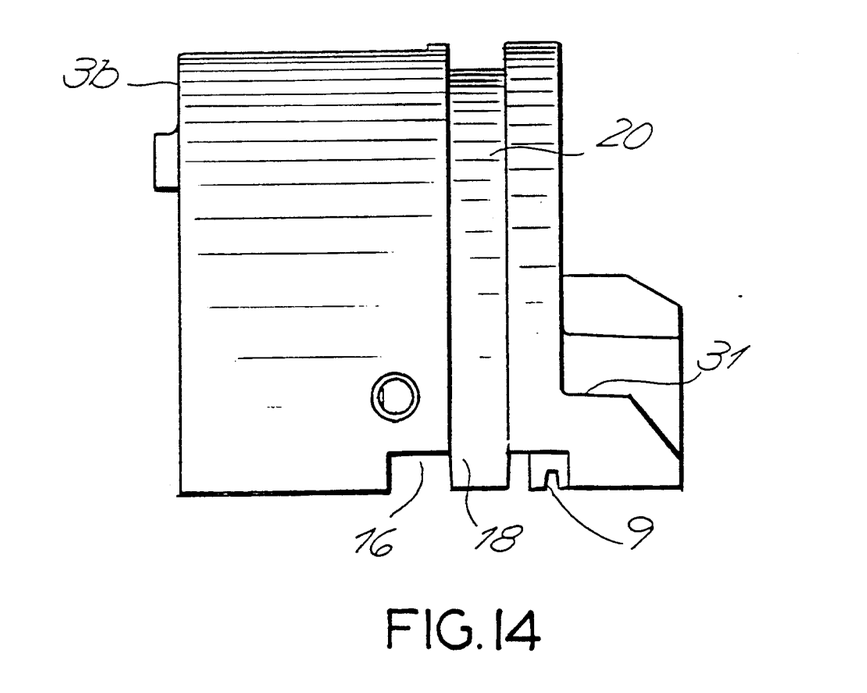
FIG. 14 is a view in direction Z in FIG. 10.
Figure 15:
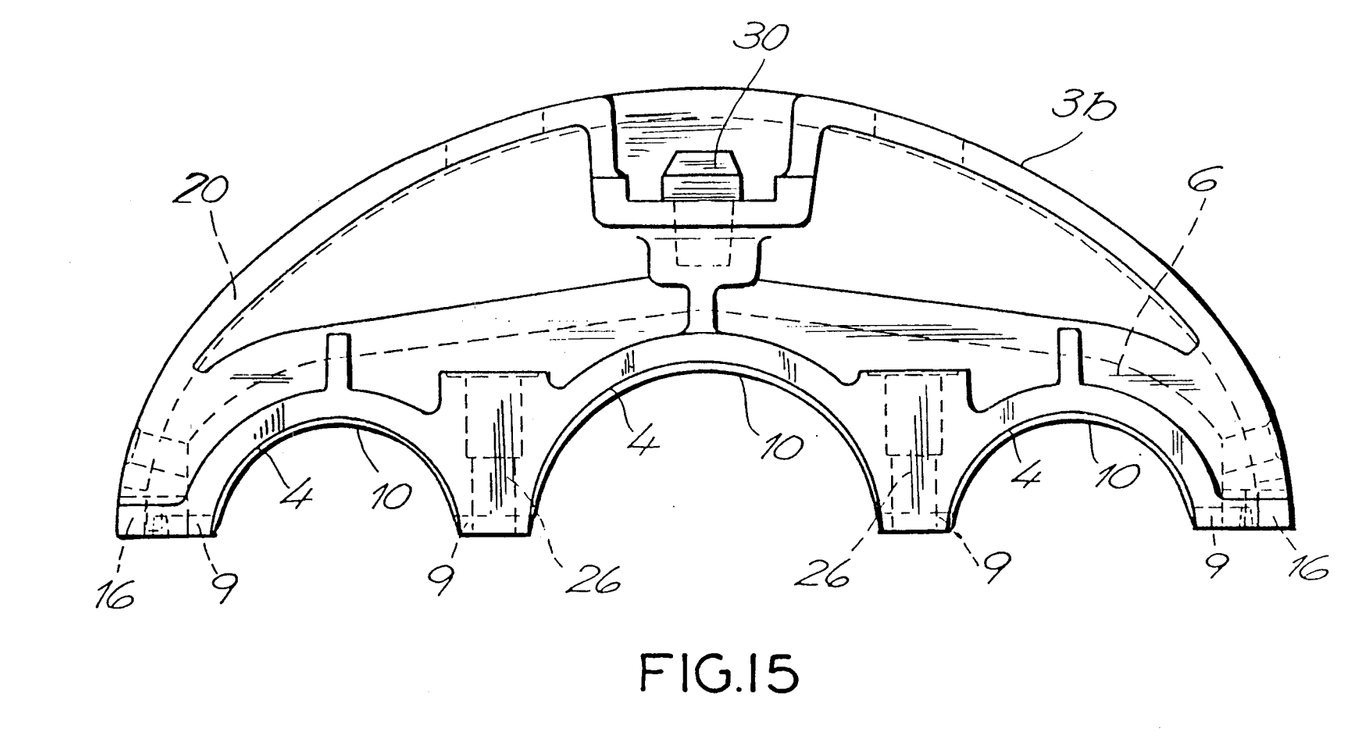
FIG. 15 is a view in direction Y in FIG. 12.

Filling rods 14 shown in FIG. 2 are insertable into cable passage openings which are not in use. The filling rods 14 have annular sealing members 15 which rest against the respective bearing shell 5. The sealing member halves 3a, 3b have in their abutting edge regions sealing chambers 16 for sealing the injection chamber 6. Sealing sections 17 can be pressed into the sealing chambers 16. As illustrated in FIG. 14 only the lower sealing member half 3b has in the region of the abutting edge surfaces thereof the sealing chambers 16 with a locking nose 18 each for engagement in a locking recess 19 of the inserted sealing section 17. The sealing sections 17 are constructed as sealing projections of a circumferential sealing member 21, for example, an O-seal, which extends around the sealing member 3 in a locking groove 20. The locking groove 20 has a bearing head 22 for the overlapping sealing tongues at the ends of the O-seal. The overlapping sealing tongues are not illustrated in the drawing.

Figure 3:
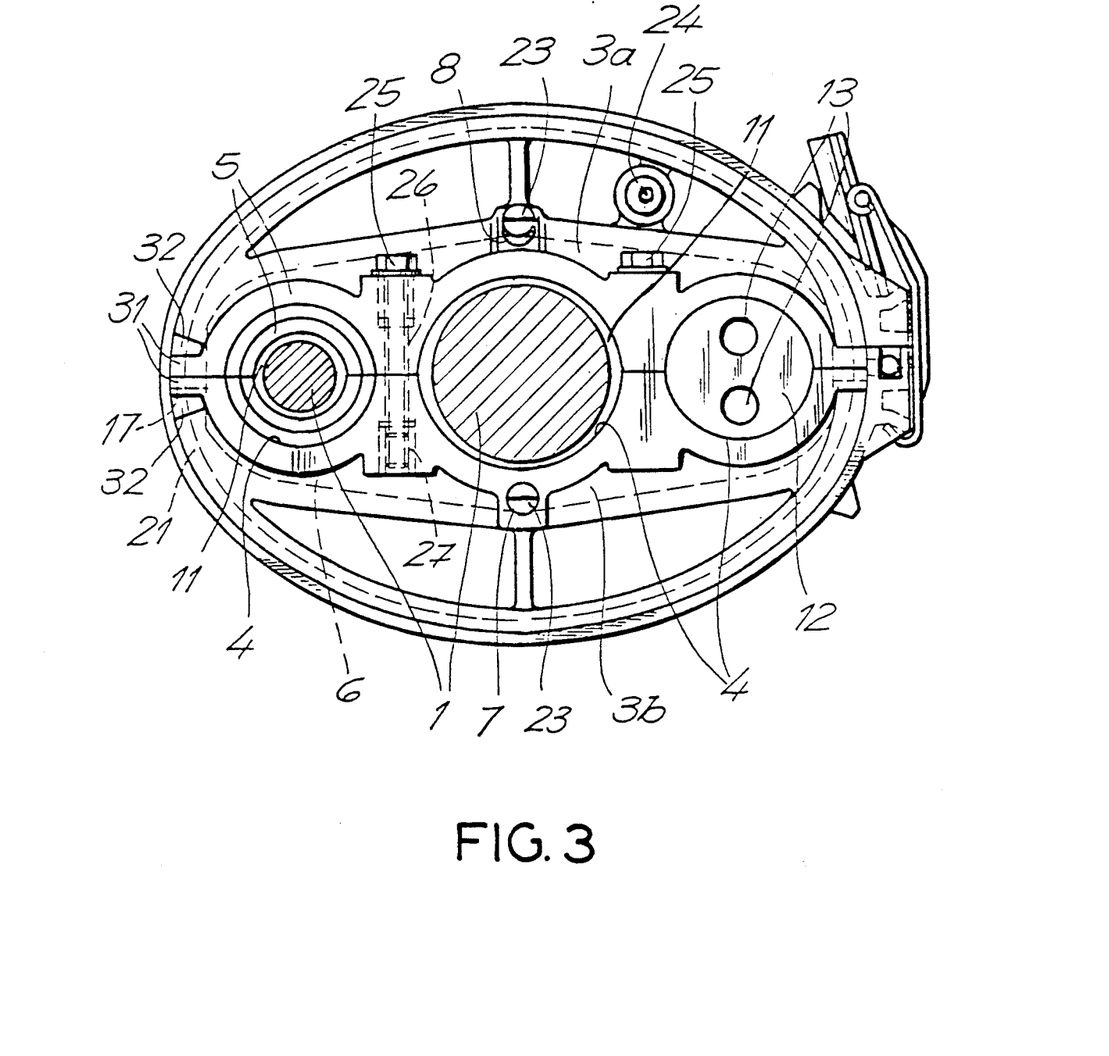
FIG. 3 is a front view of the cable splice assembly of FIG. 1.
Figure 4:
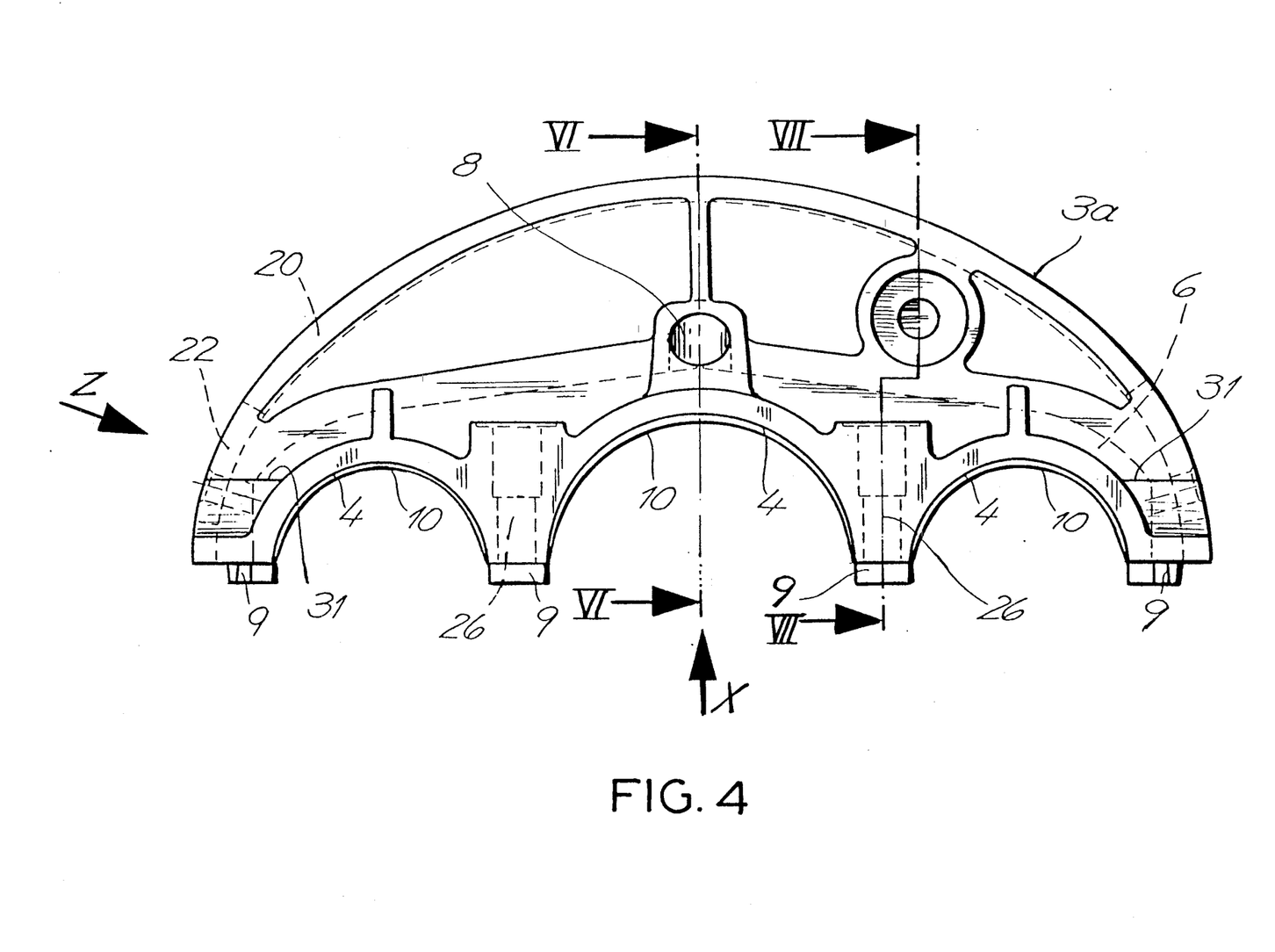
FIG. 4 is a sectional view, on a larger scale,, of the upper half of a sealing member for the cable splice assembly of FIG. 1.
Figure 5:
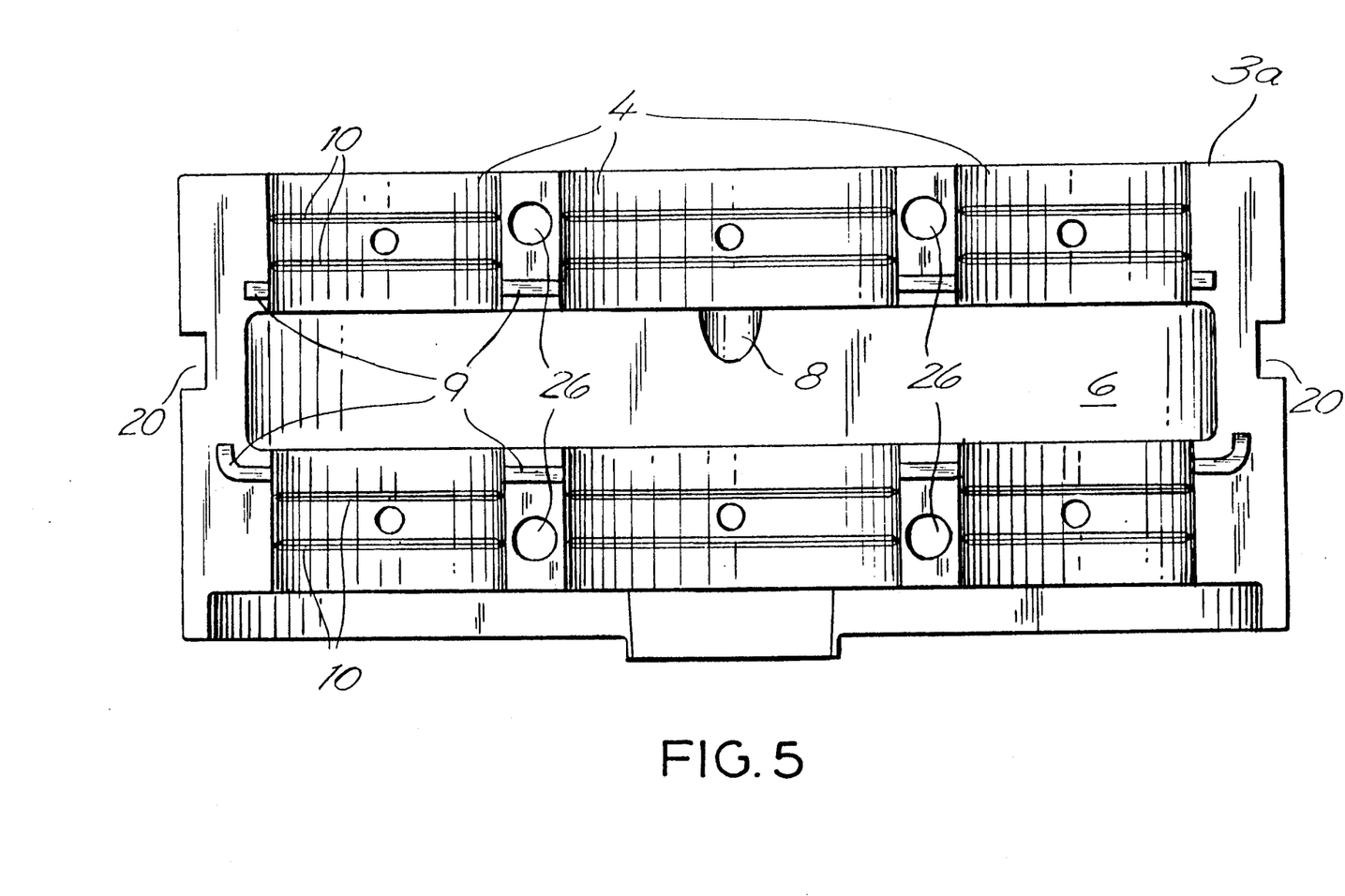
FIG. 5 is a view seen in direction X of FIG. 4.
Figure 6:
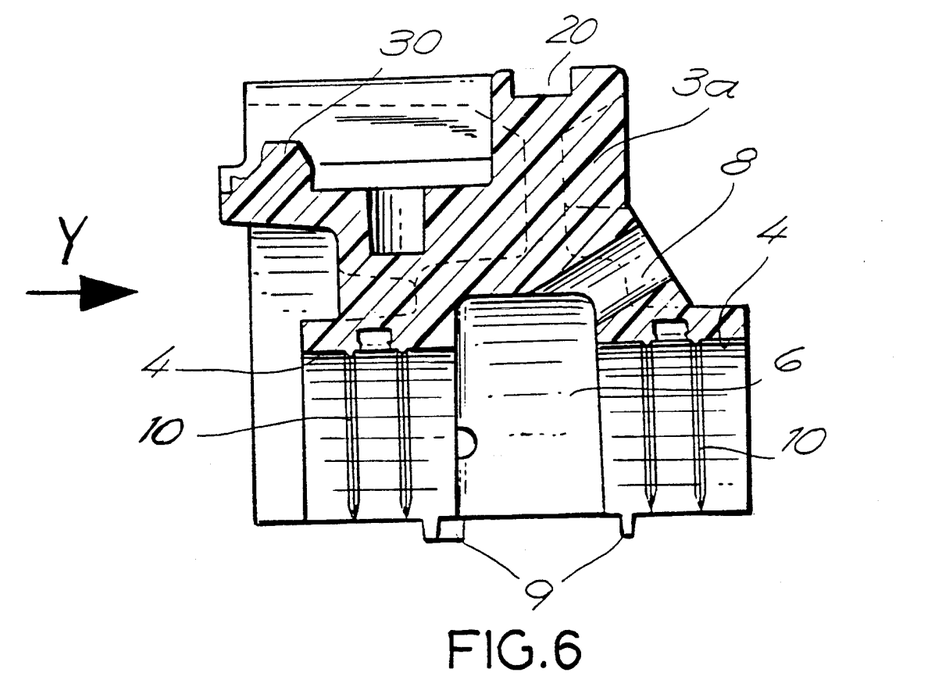
FIG. 6 is a sectional view taken along sectional line VI—VI of the sealing member half shown in FIG. 4.
Figure 7:
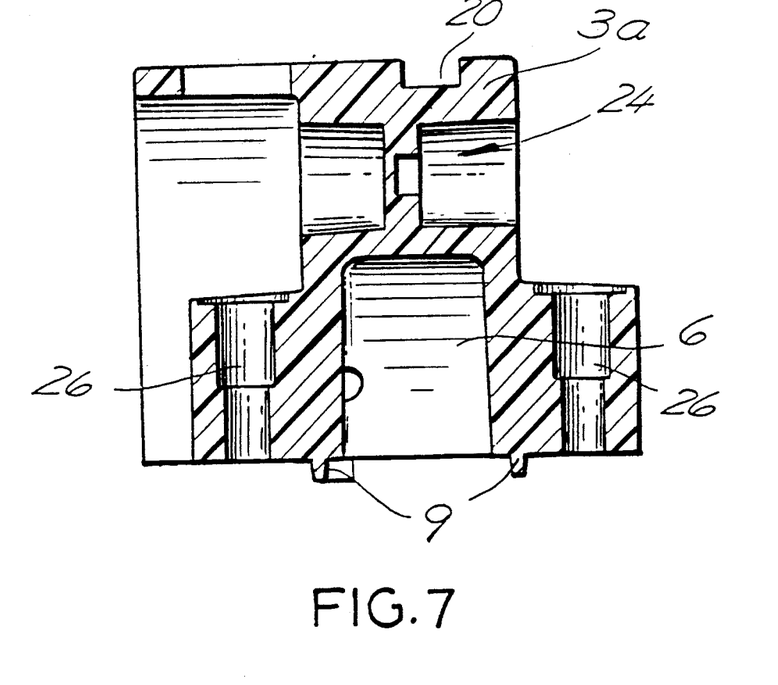
FIG. 7 is a sectional view, taken along sectional line VII—VII of the sealing member half of FIG. 4.
Figure 8:
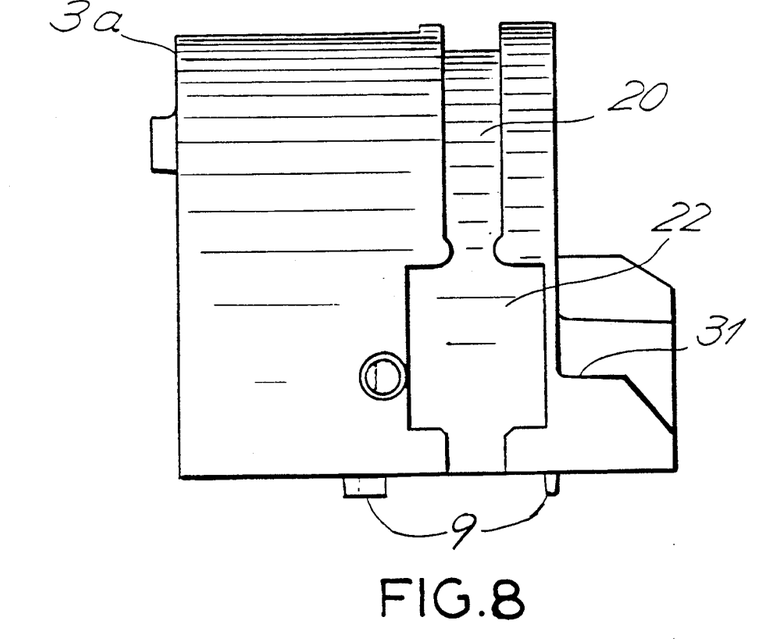
FIG. 8 is a view seen in direction Z of FIG. 4.
Figure 9:
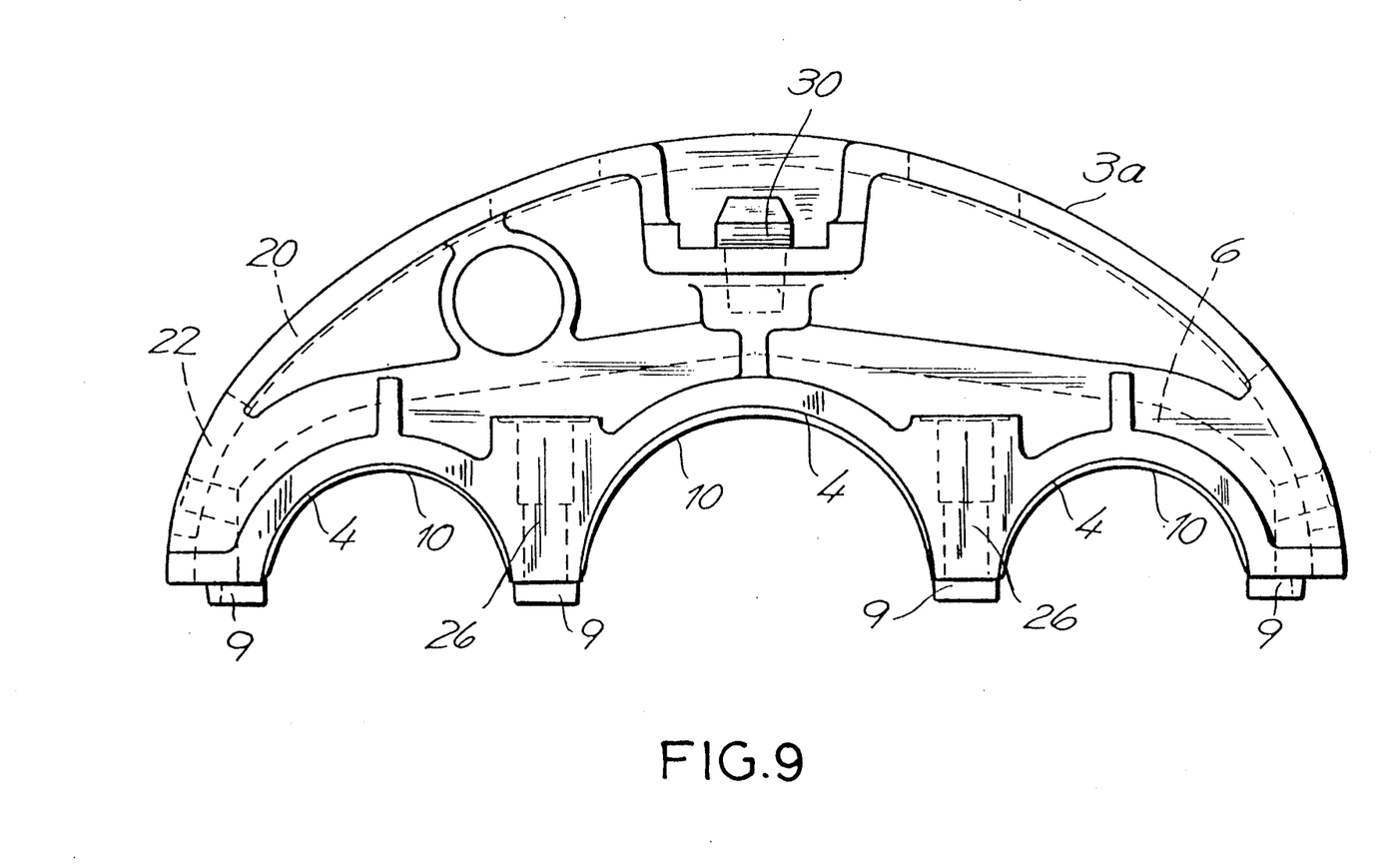
FIG. 9 is a view seen in direction Y of FIG. 6.
Figure 10:
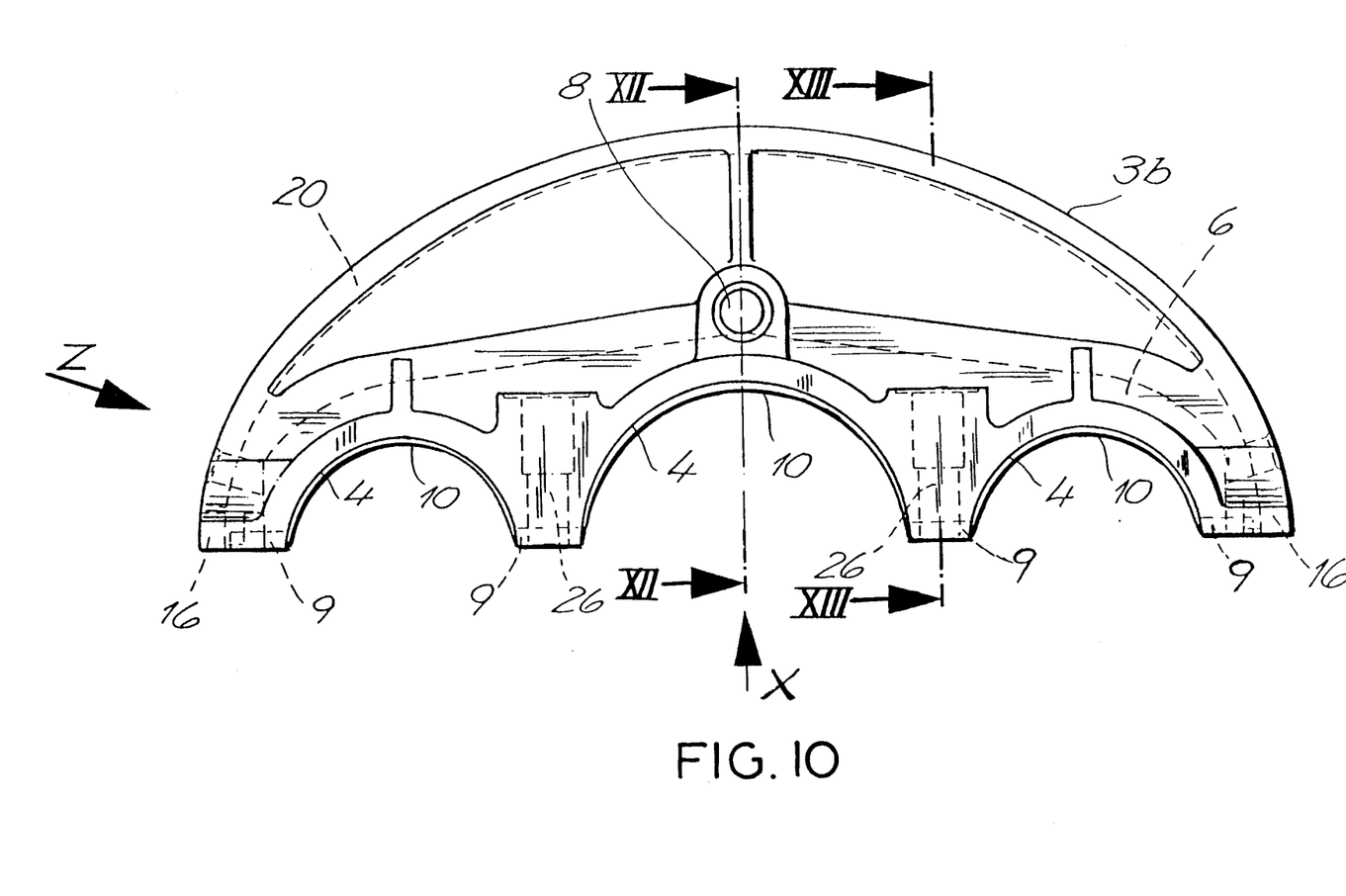
FIG. 10 is a sectional view, on a larger scale, of the lower half of a sealing member for the cable splice assembly of FIG. 1.
Figure 11:
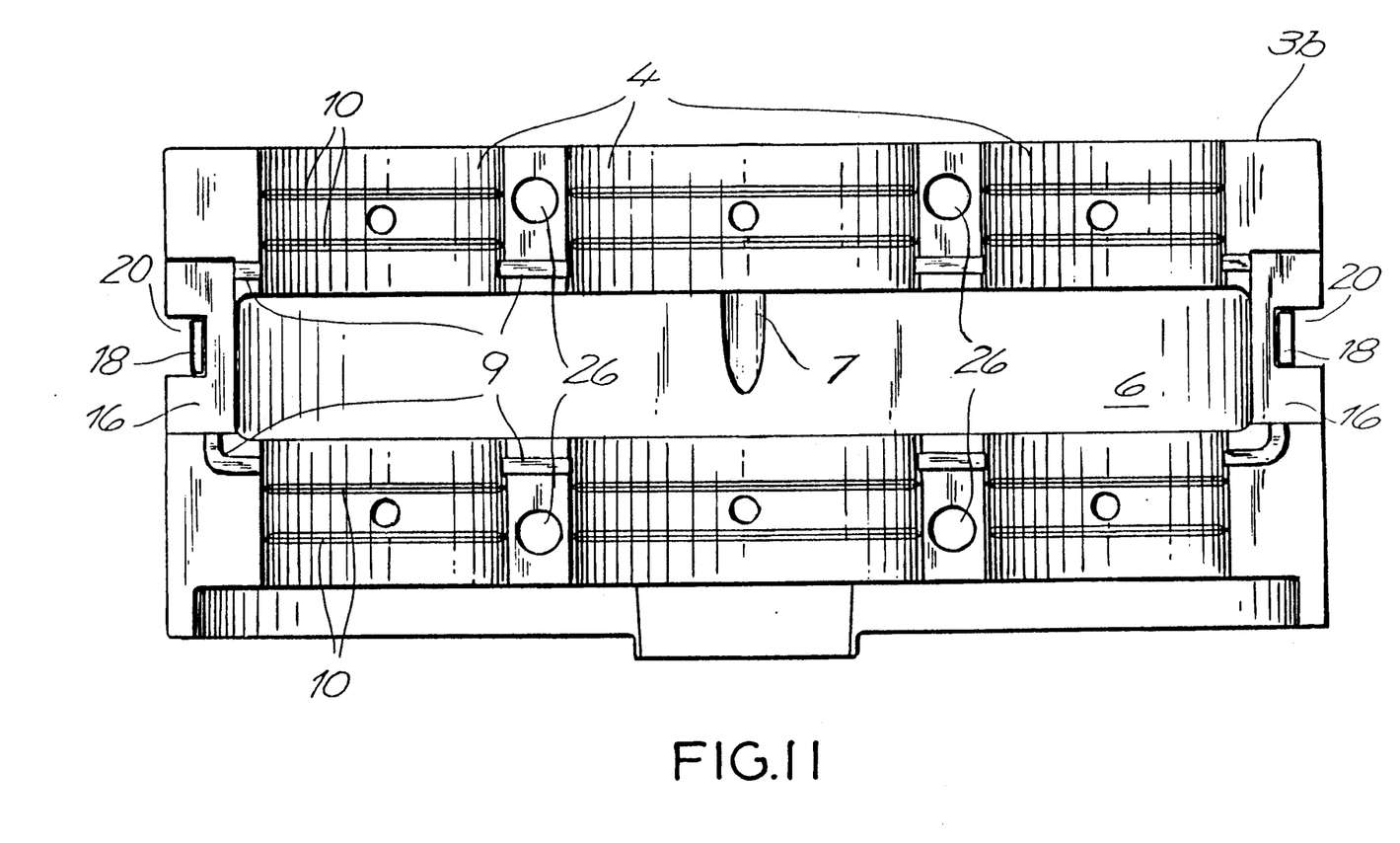
FIG. 11 is a view in direction X of FIG. 10.
Figure 12:
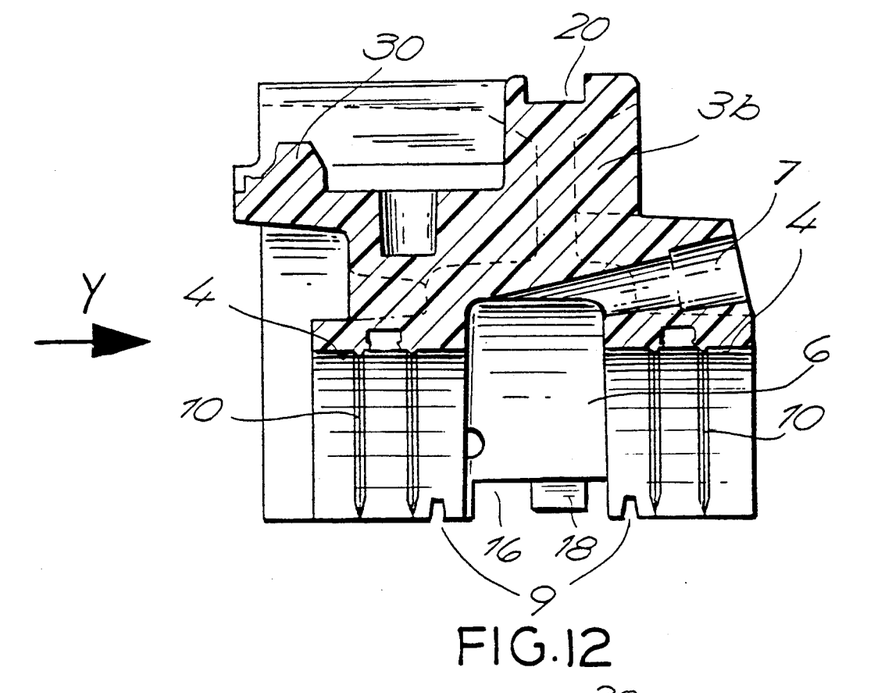
FIG. 12 is a vertical sectional view taken along sectional line XII—XII of the sealing member half of FIG. 10.
Figure 13:
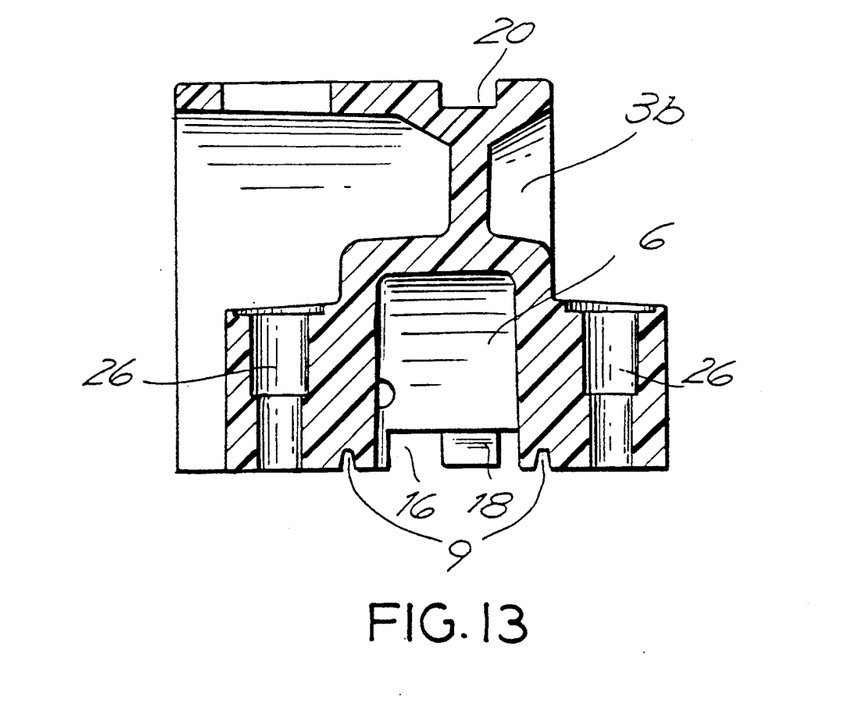
FIG. 13 is vertical sectional view taken along sectional line XIII—XIII of the sealing member half of FIG. 10.

The injection opening 7 and the venting opening 8 may be bores with a threaded plug 23 each, as shown in FIG. 3. An air valve 24 is inserted in the upper sealing member half 3a. The sealing member halves 3a, 3b are clamped together in pairs by means of threaded bolts 25. The threaded bolts 25 can be screwed into bores 26 with threaded inserts 27 provided between the front and rear cable passage opening 4. The two sealing members 3 to be placed in the pipe sleeve 2 can be spaced apart by means of an upper and a lower tension-reducing rail 28. For this purpose, the tension-reducing rail 28 shown in FIG. 1 to be screwed onto the sealing members 3 have centering bores 29 at predetermined distances, wherein centering fans 30 on the rear side of the sealing members 3 engage in the centering bores 29. As illustrated in FIG. 2, the sealing members 3 additionally have on both sides thereof centering projections 31 as stops for centering projections 32 of the pipe sleeve 2, so that the socket pipe 2 is secured against rotation. Moreover, the sealing members 3 are of thermoplastic material and have an elliptically-shaped circumference. As mentioned above, the material of the bearing shells 5 is an elastomer. Suitable materials of all components of the cable splice assembly are described, for example, in U.S. Pat. Nos. 4,933,512; 4,831,215; 4,704,499; 4,492,816; 4,424,412 and 3,692,926.

While a specific embodiment of the invention has been shown and described in detail to illustrate the application of the inventive principle, it will be understood that the invention may be embodied otherwise without departing from such principles.

I claim:

1. In a cable splice assembly for connecting and branching cables, particularly telecommunication cables, the cable splice assembly including a pipe sleeve with end faces, and sealing members with cable passage openings for insertion in the end faces of the pipe sleeve, the sealing members comprising sealing member halves, the sealing members being transversely divided to form the sealing member halves, the sealing member halves including semicircular sealing elements, the sealing elements lining the cable passage openings for an adaptation to different cable diameters, the improvement comprising the cable passage openings being front and rear cable passage openings which are spaced apart from each other at a predetermined distance in longitudinal direction of the cable to be installed, an injection chamber suitable for all cables to be accommodated being defined between the front cable passage opening and the rear cable passage opening, the injection chamber having an injection opening and a venting opening, the sealing member halves having abutting edge surfaces, the sealing member halves tongue and groove connections in the abutting edge surfaces thereof, means for clamping the sealing member halves together, wherein the sealing elements are removable bearing shells.

2. The cable splice assembly according to claim 1, wherein the cable passage openings and the bearing shells have interengaging toothings for axially securing the cable passage openings relative to the bearing shells.

3. The cable splice assembly according to claim 1, wherein the toothings are conical grooves.

4. The cable splice assembly according to claim 1, wherein the cables to be installed comprise sealing tape wound thereon, each cable to be installed being placeable in one of the bearing shells whose diameter corresponding to the diameter of the cable to be installed.

5. The cable splice assembly according to claim 1, comprising bending-elastic adapter plugs mounted in the cable passage openings, the adapter plugs having at least one bore for passing one or more cables of different diameter therethrough.

6. The cable splice assembly according to claim 1, comprising filling rods placed in cable passage openings which are not to be used, the filling rods having annular sealing members which rest against the bearing shells.

7. The cable splice assembly according to claim 1, wherein the sealing member halves define sealing chambers in the abutting edge surfaces, the sealing chamber serving to seal the injection chamber, sealing sections being pressed into the sealing chamber.

8. The cable splice assembly according to claim 1, wherein one of the sealing member halves defines sealing chambers at the edge surface, the sealing chambers each having a locking projection for engaging in a locking recess of a sealing section pressed into the sealing chamber, wherein the sealing sections being sealing projections of a circumferential sealing member extending around the sealing member in a locking groove.

9. The cable splice assembly according to claim 8, wherein the circumferential sealing member is an O-seal.

10. The cable splice assembly according to claim 1, wherein the injection opening and the venting opening are bores with a threaded plug each.

11. The cable splice assembly according to claim 1, comprising an air valve each in the upper sealing member half and the lower sealing member.

12. The cable splice assembly according to claim 1, wherein the sealing member halves are clamped together in pairs by means of threaded bolts, wherein the threaded bolts can be screwed into bores with threaded inserts provided between the front and rear cable passage opening.

13. The cable splice assembly according to claim 1, comprising an upper and a lower tension relieving rail for spacing apart the sealing members mounted in the pipe sleeve, means for screwing the tension relieving rails to the sealing members, the tension relieving rails having centering bores spaced apart at a predetermined distance, the sealing members having at sides which face each other centering cams for engagement in the centering bores.

14. The cable splice assembly according to claim 1, wherein the sealing members have on both sides thereof centering projections and the sleeve pipe has centering projections, wherein the centering projections of the sealing members act as stops for the centering projections of the pipe sleeve.

15. The cable splice assembly according to claim 1, wherein the sealing members are of a thermoplastic material.

16. The cable splice assembly according to claim 1, wherein the sealing members have an elliptically-shaped circumference.

* * * * *